United States Patent [19]

Ozue et al.

[11] Patent Number: 5,677,803
[45] Date of Patent: Oct. 14, 1997

[54] APPARATUS FOR RECORDING DATA SIGNALS AND A SIGNAL HAVING A REPETITIVE FREQUENCY TO A RECORDING MEDIUM AND/OR FOR REPRODUCING THE DATA SIGNALS THEREFROM

[75] Inventors: Tadashi Ozue; Yukio Watanabe, both of Kanagawa, Japan

[73] Assignee: Sony Corporation, Tokyo, Japan

[21] Appl. No.: 515,447

[22] Filed: Aug. 15, 1995

[30] Foreign Application Priority Data

Aug. 16, 1994 [JP] Japan .................. 6-214204

[51] Int. Cl.$^6$ ............................................. G11B 15/12
[52] U.S. Cl. ................... 360/61; 360/64; 360/77.14; 360/21
[58] Field of Search ......................... 360/21, 18, 61, 360/64, 77.14, 77.15

[56] References Cited

U.S. PATENT DOCUMENTS

| | | | |
|---|---|---|---|
| 3,925,815 | 12/1975 | Lemelson | 360/66 X |
| 4,669,002 | 5/1987 | Nishioka | 360/64 |
| 5,459,617 | 10/1995 | Yanagihara | 360/21 |
| 5,502,603 | 3/1996 | Kohno | 360/77.14 |

*Primary Examiner*—Aristotelis M. Psitos
*Assistant Examiner*—Alan Faber
*Attorney, Agent, or Firm*—William S. Frommer; Alvin Sinderbrand

[57] ABSTRACT

By merely using one reproducing head, an overwriting operation and an ATF operation can be performed, thereby reducing a crosstalk obstruction and modulation noises. Recording heads 7 and 8 having different azimuth angles and a reproducing head 9 having the same azimuth angle as that of the recording head 7 are provided for a drum 3. An (A) track constructed by a data region and an ATF pilot region is recorded to a magnetic tape 1 by the recording head 7. A (B) track constructed by a data region in which a single signal of a short wavelength is recorded and an ATF pilot region is recorded to the magnetic tape 1 by the recording head 8. Upon reproduction, the (A) track is reproduced by the reproducing head 9. Although the (B) track is not reproduced, the single signal is recorded as a (B) track, so that the overwriting operation and the ATF operation of an area method can be performed and, further, an excellent signal can be reproduced from the (A) track.

7 Claims, 3 Drawing Sheets

APPARATUS FOR RECORDING DATA SIGNALS AND A SIGNAL HAVING A REPETITIVE FREQUENCY TO A RECORDING MEDIUM AND/OR FOR REPRODUCING THE DATA SIGNALS THEREFROM

BACKGROUND OF THE INVENTION

1. Field of the Invention

The invention relates to a rotary head type recording and reproducing apparatus of a helical scan type to record code data, audio information, video information, or the like onto a tape shaped recording medium.

2. Description of the Related Art

As a method of a conventional recording and reproducing apparatus of the helical scan type, as shown in FIG. 1A, there is a case where data recorded with a guard band (non-recording area) by a recording head Hw (not shown) of a single azimuth angle is reproduced by a reproducing head Hr of the same azimuth angle. The reason why the recording head and the reproducing head are individually used without commonly using one head for recording and reproducing is because in case of a digital data memory apparatus, an RAW (Read After Write) operation is needed for a verifying operation of recorded data. Such a method, however, has a drawback such that if there is no servo head Hs, a tracking, namely, what is called an ATF (Automatic Track Finding), to reproduce information recorded in a helical track cannot be performed.

In case of overwriting, further, data has to be newly recorded to the same position as that of the track which has already been recorded. However, it is actually difficult to record data to the same position as that of the track which has already been recorded, so that a non-erased portion of the track that has already been recorded occurs. To prevent it, a fixed erasing head for erasing the whole width of the tape is individually needed.

As another method, there is a method whereby data which was recorded by two recording heads Hw having different azimuth angles as shown in FIG. 1B (only one recording head is shown) is reproduced by two reproducing heads Hr having the same azimuth angles as those of the recording heads Hw as shown in FIG. 1C (only one reproducing head is shown), respectively. According to such a method, however, although it is excellent with respect to a recording density, since the two reproducing heads Hr are needed, it is unsuitable to a case where driving costs are prior to the recording density.

Further, in the case where a track width is narrowed more and more, there are not only a problem of a crosstalk interference from a track which has the same azimuth angle and is adjacent to the neighboring track as shown in FIG. 1D but also problems such as occurrence of non-erased portion of the overwriting operation, increase in modulation noises, and the like depending on the signal recorded before the overwriting operation.

OBJECTS AND SUMMARY OF THE INVENTION

It is, therefore, an object of the invention to provide a rotary head type recording and reproducing apparatus which can improve a crosstalk from the adjacent tracks, modulation noises, and the like when reproducing a data track and which can also perform an overwriting and an ATF (Automatic Track Finding).

According to the invention, there is provided a rotary head type recording and reproducing apparatus for recording and reproducing data to/from a magnetic recording medium by rotary heads, comprising: first and second recording heads which are provided for a rotary drum and have different first and second azimuth angles; a reproducing head which is provided for the rotary drum and has the same azimuth angle as that of one of the first and second azimuth angles; recording means for recording data by using one of the first and second recording heads without causing a guard band and for recording a signal of a single repetitive frequency to a magnetic recording medium by another one of the first and second recording heads; and reproducing means for reproducing the data by the reproducing head from a track formed by one of the first and second recording heads.

Data is recorded by one of the two recording heads having different azimuth angles and a single signal with a short wavelength is recorded by the other recording head. It is possible to perform the ATF and overwriting by forming an area in which the single signal has been recorded. It is sufficient to provide one reproducing head having the same azimuth angle as that of the recording head by which the data was recorded, so that the driving costs can be reduced. Further, when reproducing the data track, the crosstalk from the adjacent tracks, the modulation noises, or the like can be improved without having a servo head.

The above and other objects and features of the present invention will become apparent from the following detailed description and the appended claims with reference to the accompanying drawings.

DETAILED DESCRIPTION OF THE PREFERRED EMBODIMENT

Figure 1A:
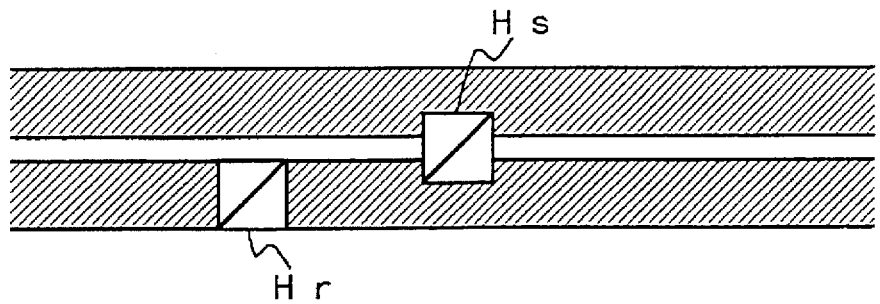
FIGS. 1A to 1D are schematic diagrams showing conventional examples of helical tracks.
Figure 1B:
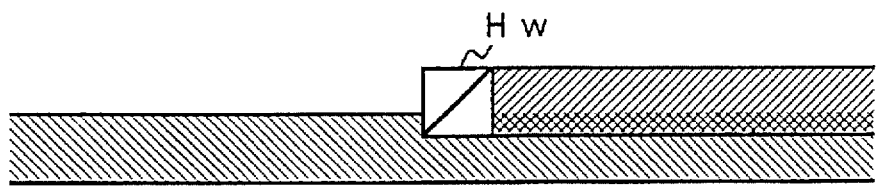
Figure 1C:
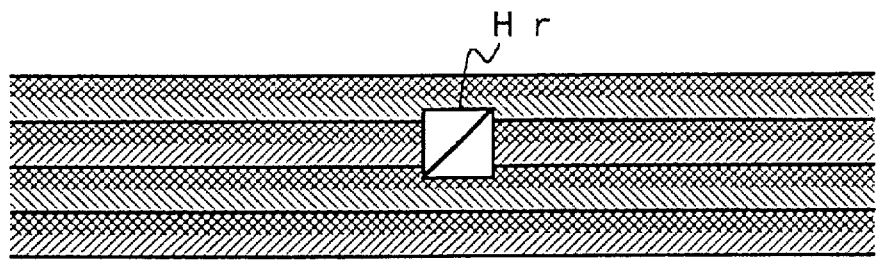
Figure 1D:
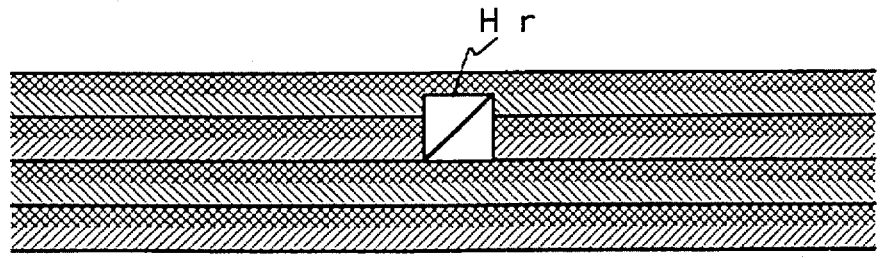
Figure 2:
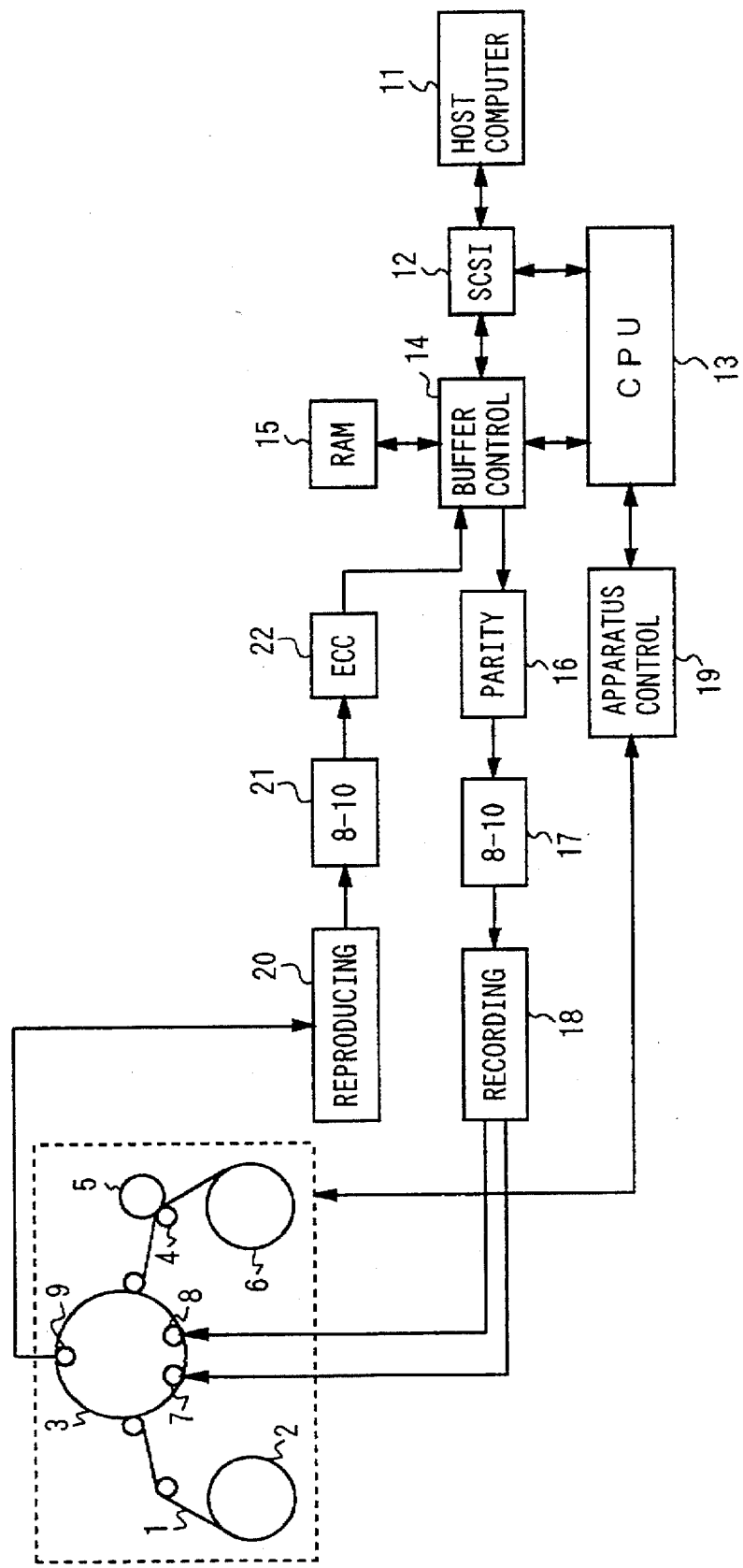
FIG. 2 is a block diagram showing an example of a data memory signal of the invention.

An embodiment of the invention will now be described hereinbelow with reference to the drawings. The embodiment shows a data memory system of a computer and its schematic construction is shown in FIG. 2. Reference numeral 1 denotes a magnetic tape which is fed out from a supply reel 2, is obliquely wound around a cylindrical surface of a drum 3 that is rotated at a predetermined rotational speed, is run by a capstan 4 and a pinch roller 5 at a predetermined speed, and is wound by a take-up reel 6. The supply reel 2 and take-up reel 6 are enclosed in a cassette. The magnetic tape 1 is wound around the drum 3 by an angle slightly larger than 180°.

The drum 3 is constructed by, for example, a fixed lower drum and a rotary upper drum. Recording heads 7 and 8 and a reproducing head 9 are attached to the rotary drum. Among those heads, angles between gap lines of the two recording heads 7 and 8 which form adjacent tracks and a line which intersects perpendicularly to the longitudinal direction of the track are made different (such angles are referred to as azimuth angles). Thus, it is possible to perform the recording without providing a guard band (non-recording area). At this time, the recording head 7 and the reproducing head 9 having the same azimuth angle as that of the head 7 face each other with an interval of an angle of 180°. The recording heads 7 and 8 are closely arranged and are attached to the drum 3 so as to have a difference in the height direction.

Recorded data is supplied from a host computer 11 to a buffer control circuit 14 through an SCSI (Small Computer System Interface) circuit 12. The supplied recorded data is stored into a buffer memory (RAM) 15 relating to the buffer control circuit 14. The data read out from the buffer memory 15 is subjected to signal processes by a parity forming circuit 16, an 8-10 modulating circuit 17, and a recording amplifier 18 and is recorded onto the magnetic tape 1 by using the recording heads 7 and 8.

A parity for an error correction code is formed by the parity forming circuit 16. The 8-10 modulating circuit 17 converts the supplied data of eight bits to the data of ten bits. A DC component and a low frequency component of the recorded data are reduced by the modulation. The recorded data converted to the 10-bit data is supplied to the recording amplifier 18. The amplifier 18 executes a signal process to record the data to the magnetic tape 1. Output signals of the recording amplifier 18 are supplied to the recording heads 7 and 8 through rotary transformers (not shown).

Figure 3:
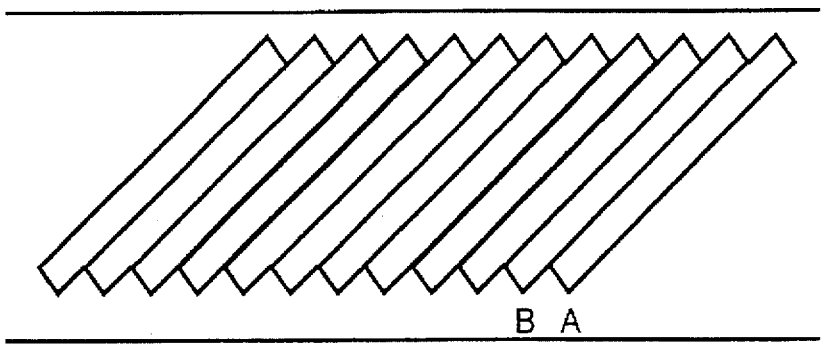
FIG. 3 is a schematic diagram showing an example of a track pattern of a magnetic tape according to the invention.
Figure 4:
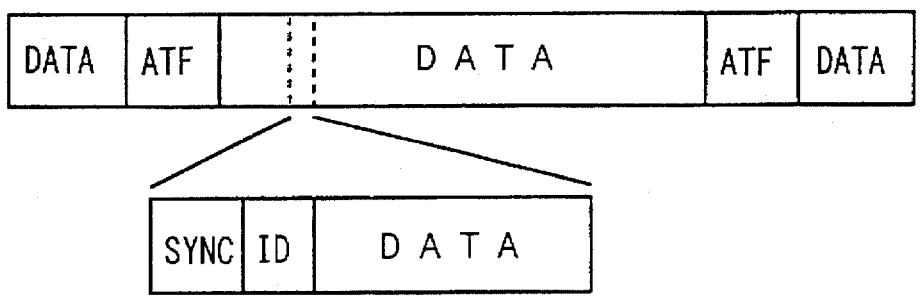
FIG. 4 is a schematic diagram showing an example of a data construction of a track according to the invention.

As shown in FIG. 3, therefore, the signals are recorded as oblique tracks on the magnetic tape 1. An (A) track in FIG. 3 is recorded onto the magnetic tape 1 by, for example, the recording head 7 and is constructed by data regions and ATF pilot regions as shown in FIG. 4. In the data region, data is recorded by setting an SYNC portion, an ID portion, and a data portion to one block. A (B) track is recorded by, for example, the recording head 8 and is constructed by the data regions and the ATF pilot regions in a manner similar to the (A) track. In the data region of the (B) track, a single signal having a short wavelength of any one of 1T, 2T, 3T, and 4T of the 8-10 modulation is recorded. In this instance, (T) indicates one period of a channel bit clock. A wavelength corresponding to 1T is equal to, for example, 0.45 [µm]. As mentioned above, by recording the single signal as a (B) track, there is no non-recording area and the overwriting can be executed.

The data reproduced by the reproducing head 9 from one track (A) of the two adjacent tracks on the magnetic tape 1 is supplied to a reproducing amplifier 20 through a rotary transformer (not shown). An output signal of the reproducing amplifier 20 is supplied to an error correction circuit 22 through an 8-10 modulating circuit 21. The supplied reproduction data is decoded by the 8-10 modulating circuit 21. The decoded reproduction data is supplied to the error correction circuit 22. The error correction circuit 22 decodes an error correction code, thereby correcting errors. A signal which is outputted from the error correction circuit 22 is stored into the buffer memory 15 on the basis of a control of the buffer control circuit 14. In accordance with a request, the reproduction data is transferred to the host computer 11 through the SCSI circuit 12.

When explaining simply with respect to an ATF method, there are an ATF area method and an ATF multiplying method as ATF methods. The ATF area method is used in the embodiment. According to such a method, a predetermined interval between the tracks is set to an ATF pilot area to which the ATF pilot signal is recorded. According to the ATF multiplying method, the ATF pilot signal is frequency multiplexed to the recording signal in the whole track.

In case of the digital data memory system, since the frequency multiplex cannot be used, the ATF area method is generally used. According to the ATF area method, the pilot signal which has little azimuth inclination loss and whose wavelength is relatively long is fundamentally used. A tracking error is detected from the level relation of the reproduced pilot signals occurring by the ATF areas of the adjacent tracks.

Figure 5:
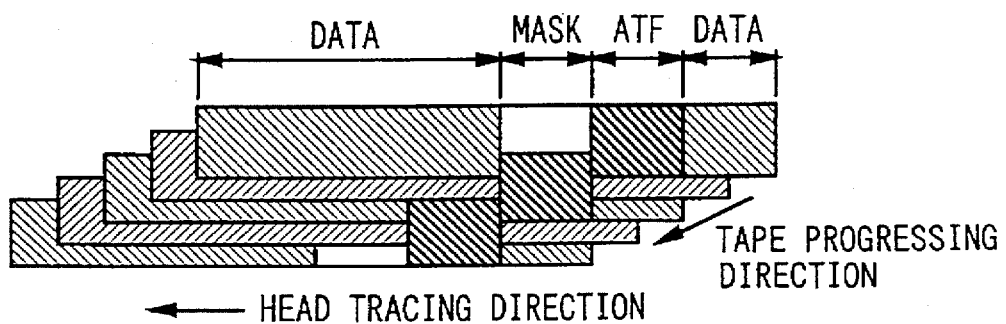
FIG. 5 is a schematic diagram showing an example of track patterns recorded to a magnetic tape by a track pitch that is three times as high as a normal pitch.

As disclosed in a Patent Application having a Ser. No. 08/317,484 filed on Oct. 4, 1994, and now U.S. Pat. No. 5,502,603, the assignee of the present invention has proposed the ATF area method in which a signal having a relatively short wavelength can be used as an ATF pilot signal as in such an embodiment. When explaining such a method with reference to FIG. 5, first, a digital recording signal is recorded at a width of 3Tp (track pitch) by the preceding first recording head. The digital recording signal which is recorded on one track is constructed by, for example, a data interval, a mask interval, a pilot signal interval for ATF, and a data interval. The mask interval is the interval in which the supply of a recording current to a head is obstructed. In FIG. 5, oblique tracks are shown as tracks in the horizontal direction. An oblique line for the track indicates an azimuth angle of the recording head which recorded such a track.

The second recording head performs the recording (overwriting) operation so as to overlap the track formed by the first recording head by a width of 2Tp. The recording operations of the first and second recording heads are almost simultaneously performed. The second recording head includes the mask interval so as not to erase the pilot signal recorded by the first recording head and doesn't record the ATF pilot signal.

Further, the first recording head scans the magnetic tape again and overwrites recording data by the overlap width of 2Tp with the track formed by the second recording head. In this case, since the mask interval is included in each of the tracks formed by the first and second recording heads, the pilot signal recorded before is not erased but remains. As mentioned above, by repeating the recording operation, the recording interval of the pilot signal of the width of 3Tp is formed at a predetermined position on the tape. When paying an attention to the track formed by the first recording head, a pilot signal interval adjacent to one track edge and, subsequently, a pilot signal interval adjacent to another track edge are formed in such a track. When reproducing such a target track, the ATF operation is executed from the level relation of the pilot signals to be reproduced in the pilot signal interval.

In the embodiment, only the data of the (A) track recorded by the recording head 7 is reproduced by using the reproducing head 9. That is, the data can be reproduced by only one reproducing head 9. A head width of the reproducing head 9 is larger than the (A) track width and is smaller than a track width of (A track+B track). In the reproduction of the data of the (A) track, when the single signal recorded in the (B) track by the azimuth angle of, for example, ±20° is a 4T signal, it will be obviously understood that, owing to the azimuth effect, a level of a crosstalk component which is reproduced from the (B) track is sufficiently smaller than a level at which the signal detection of the (A) track is obstructed. The single signal recorded in the (B) track and the ATF pilot signal have a frequency relation such that they can be separated by a filter upon reproduction.

Similarly, when reproducing the data of the (A) track, as compared with an S/N ratio in the case where a modulation signal is recorded in the (B) track, an S/N ratio in the case where the single signal, for example, 2T signal is recorded in the (B) track is better by two to four dB. Namely, modulation noises upon reproduction in the case where the single signal is recorded in the (B) track are smaller. In this instance, it is considered that when reproducing the (A) track, the S/N ratio of the signal which has already been recorded in the (A) track depends on the signal to be recorded in the (B) track. By selecting the single signal as a signal to be recorded in the (B) track, an excellent signal can be obtained from the (A) track.

In this instance, according to the embodiment, although the data to be recorded/reproduced is the digital data, an analog signal can be used as contents of the (A) track or an audio signal and a video signal other than data can be also used.

In the embodiment, although the modulation signal has been 8-10 modulated, any modulation other than the 8-10 modulation can be also performed.

According the embodiment, further, although the track pitch widths of the (A) and (B) tracks are the same, the track pitch widths of the (A) and (B) tracks can be also made differ.

Further, according to the embodiment, although the (A) and (B) tracks have simultaneously been recorded, it is not always necessary to simultaneously record the (A) and (B) tracks. For example, two recording heads are arranged so as to face each other with an interval of an angle of 180° and it is also possible to provide the reproducing head between the recording heads, namely, with an interval of an angle of 90°.

According to the rotary head type recording and reproducing apparatus of the invention, from a viewpoint of the recording signal, although the recording operation with the guard band is performed, the recording without a non-recording area is executed. Therefore, the overwriting operation by only the rotary head can be executed and the ATF operation using the ATF area method can be performed. Moreover, since it is sufficient to provide one reproducing head, the construction can be simplified and the driving costs can be decreased.

According to the rotary head type recording and reproducing apparatus of the invention, when recording, the single signal of a short wavelength is recorded by the recording head for recording the data and the recording head having the azimuth angle, so that the obstruction by the crosstalk from the neighboring track and the increase in modulation noises can be reduced.

The present invention is not limited to the foregoing embodiment but many modifications and variations are possible within the spirit and scope of the appended claims of the invention.

What is claimed is:

1. An apparatus for recording and/or reproducing information to and/or from a recording medium, said apparatus comprising:

means having a first recording head for recording data including data representative of at least one of audio and video information only in a first plurality of tracks of said recording medium and having a second recording head for recording a signal having a single repetitive frequency only in a second plurality of tracks of said recording medium, said first and second plurality of tracks being interlaced with each other so that a track in said first plurality of tracks is arranged between two tracks in said second plurality of tracks and a track in said second plurality of tracks is arranged between two tracks in said first plurality of tracks; and reproducing means including only a single reproducing head for substantially reproducing only said data from said first plurality of tracks and for substantially not reproducing said signal having a single repetitive frequency from said second plurality of tracks.

2. An apparatus for recording and/or reproducing information according to claim 1, wherein each track in said first and second plurality of tracks includes a data portion and wherein said data is recorded into the data portions of said first plurality of tracks and said signal having said single repetitive frequency is recorded into the data portions of said second plurality of tracks.

3. An apparatus for recording and/or reproducing information according to claim 2, wherein said first recording head is used to record said data into the data portions of said first plurality of tracks and said second recording head is used to record said signal having said single repetitive frequency into the data portions of said second plurality of tracks.

4. An apparatus for recording and/or reproducing information according to claim 3, wherein the recording means includes means for recording automatic track finding (ATF) signals in ATF portions of at least one of said first and second plurality of tracks of said recording medium.

5. An apparatus for recording and/or reproducing information according to claim 4, wherein the recording means further includes means for providing sync information in the data portions of said first plurality of tracks for the data recorded in said first plurality of tracks.

6. An apparatus for recording and/or reproducing information to and/or from a recording medium, said apparatus comprising:

means including a first recording head having a first azimuth angle for recording data including sync information only in data portions of a first plurality of tracks of said recording medium and for recording automatic track finding (ATF) data in ATF portions of said first plurality of tracks of said recording medium;

means including a second recording head having a second azimuth angle which is different from said first azimuth angle for recording a signal having a single repetitive frequency only in data portions of a second plurality of tracks of said recording medium, said first and second plurality of tracks being interlaced with each other so that a track in said first plurality of tracks is arranged between two tracks in said second plurality of tracks and a track in said second plurality of tracks is arranged between two tracks in said first plurality of tracks; and reproducing means including only a single reproducing head having an azimuth angle which is the same as said first azimuth angle for substantially reproducing only said data from said first plurality of tracks and for substantially not reproducing said signal having a single repetitive frequency from said second plurality of tracks.

7. An apparatus for recording and/or reproducing information according to claim 6, wherein the recording means having said first recording head records said ATF signals in ATF portions of said second plurality of tracks of said recording medium.

* * * * *